US010025390B2

(12) United States Patent
Hildreth et al.

(10) Patent No.: US 10,025,390 B2
(45) Date of Patent: *Jul. 17, 2018

(54) ENHANCED INPUT USING RECOGNIZED GESTURES

(71) Applicant: QUALCOMM Incorporated, San Diego, CA (US)

(72) Inventors: Evan Hildreth, Ottawa (CA); Francis MacDougall, Milton (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,438

(22) Filed: Oct. 21, 2016

(65) Prior Publication Data

US 2017/0038852 A1 Feb. 9, 2017

Related U.S. Application Data

(63) Continuation of application No. 14/857,488, filed on Sep. 17, 2015, now Pat. No. 9,507,432, which is a (Continued)

(51) Int. Cl.
*G06F 15/00* (2006.01)
*G06F 13/00* (2006.01)
(Continued)

(52) U.S. Cl.
CPC .............. *G06F 3/017* (2013.01); *G06F 3/005* (2013.01); *G06F 3/0304* (2013.01);
(Continued)

(58) Field of Classification Search
CPC .................................................... G06F 3/0416
(Continued)

(56) References Cited

U.S. PATENT DOCUMENTS 5,745,165 A 4/1998 Atsuta et al.
6,144,366 A 11/2000 Numazaki et al.
(Continued)

FOREIGN PATENT DOCUMENTS

JP 2001306243 A 11/2001
JP 2003084229 A 3/2003
(Continued)

OTHER PUBLICATIONS

IEEE International Symposium on Mixed and Augmented Reality 2009.
(Continued)

*Primary Examiner* — Kevin Nguyen
(74) *Attorney, Agent, or Firm* — Kilpatrick Townsend & Stockton, LLP

(57) ABSTRACT

A representation of a user can move with respect to a graphical user interface based on input of a user. The graphical user interface comprises a central region and interaction elements disposed outside of the central region. The interaction elements are not shown until the representation of the user is aligned with the central region. A gesture of the user is recognized, and, based on the recognized gesture, the display of the graphical user interface is altered and an application control is outputted.

40 Claims, 14 Drawing Sheets

Related U.S. Application Data continuation of application No. 14/047,851, filed on Oct. 7, 2013, now Pat. No. 9,164,591, which is a continuation of application No. 12/038,626, filed on Feb. 27, 2008, now Pat. No. 8,555,207.

(51) Int. Cl.
  *G06F 3/01* (2006.01)
  *G06F 3/03* (2006.01)
  *G06F 3/0346* (2013.01)
  *G06F 3/048* (2013.01)
  *G06K 9/00* (2006.01)
  *G06T 13/40* (2011.01)
  *G06F 3/00* (2006.01)
  *G06F 3/0484* (2013.01)

(52) U.S. Cl.
  CPC ............ *G06F 3/0346* (2013.01); *G06F 3/048* (2013.01); *G06F 3/04842* (2013.01); *G06K 9/00288* (2013.01); *G06K 9/00369* (2013.01); *G06T 13/40* (2013.01); *G06T 2207/10028* (2013.01)

(58) Field of Classification Search
  USPC .................. 715/839, 769, 781, 764, 523
  See application file for complete search history.

(56) References Cited

U.S. PATENT DOCUMENTS

| | | | |
|---|---|---|---|
| 6,160,899 A | 12/2000 | Lee et al. | |
| 6,827,579 B2 | 12/2004 | Burdea et al. | |
| 7,018,211 B1 | 3/2006 | Birkhoelzer et al. | |
| 8,555,207 B2 | 10/2013 | Hildreth et al. | |
| 9,164,591 B2 | 10/2015 | Hildreth et al. | |
| 2002/0006222 A1 | 1/2002 | Inagaki et al. | |
| 2002/0041327 A1* | 4/2002 | Hildreth | G06F 3/011 348/42 |
| 2005/0212767 A1 | 9/2005 | Marvit et al. | |
| 2005/0239028 A1 | 10/2005 | Wu et al. | |
| 2005/0271279 A1 | 12/2005 | Fujimura et al. | |
| 2006/0010400 A1 | 1/2006 | Dehlin et al. | |
| 2006/0101016 A1 | 5/2006 | Uehara | |
| 2006/0125785 A1 | 6/2006 | McAlindon | |
| 2006/0136496 A1 | 6/2006 | Ohashi | |
| 2006/0164386 A1 | 7/2006 | Smith et al. | |
| 2006/0164396 A1* | 7/2006 | Anderson | G06F 3/0489 345/172 |
| 2006/0182346 A1 | 8/2006 | Yoda et al. | |
| 2007/0057912 A1 | 3/2007 | Romriell et al. | |
| 2008/0013826 A1 | 1/2008 | Hillis et al. | |
| 2008/0030460 A1 | 2/2008 | Hildreth et al. | |
| 2008/0036743 A1 | 2/2008 | Westerman et al. | |
| 2008/0089587 A1 | 4/2008 | Kim et al. | |
| 2008/0141181 A1 | 6/2008 | Ishigaki et al. | |
| 2009/0217211 A1 | 8/2009 | Hildreth et al. | |
| 2010/0235786 A1 | 9/2010 | Maizels et al. | |
| 2014/0040835 A1 | 2/2014 | Hildreth et al. | |
| 2016/0077594 A1 | 3/2016 | Hildreth et al. | |

FOREIGN PATENT DOCUMENTS

| | | |
|---|---|---|
| JP | 2003233452 A | 8/2003 |
| JP | 2005196530 A | 7/2005 |
| JP | 2006174291 A | 6/2006 |
| JP | 2007538318 A | 12/2007 |
| WO | 03025589 A1 | 3/2003 |
| WO | 2007116662 A1 | 10/2007 |

OTHER PUBLICATIONS

International Search Report and Written Opinion—PCT/US2009/035555—ISA—dated Jul. 28, 2009.
Two-Handed Drawing on Augmented Desk System 2002.

* cited by examiner

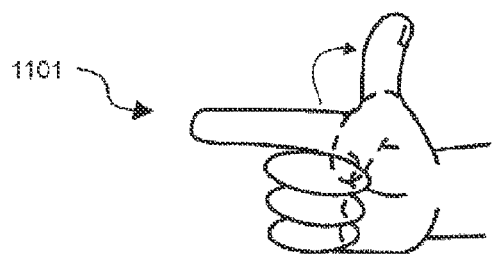
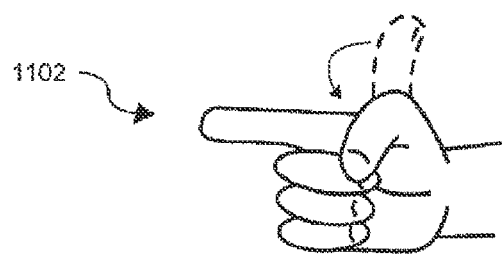
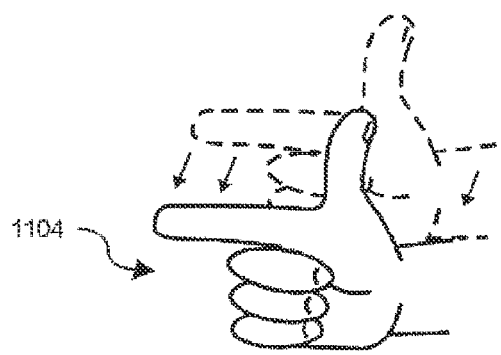
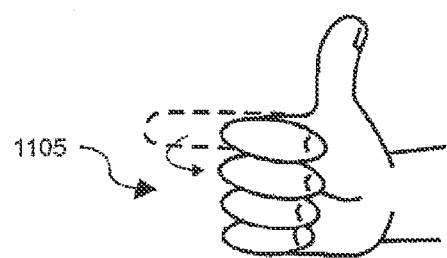
FIG. 11

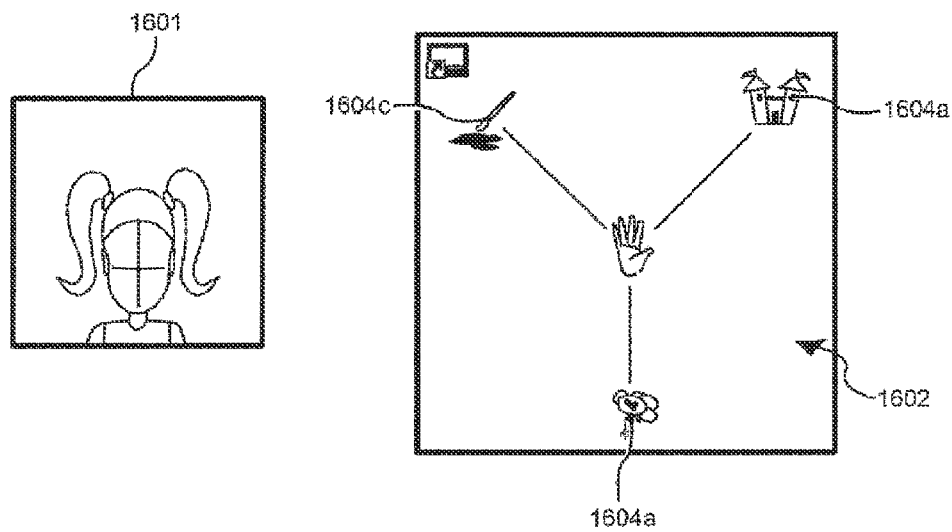
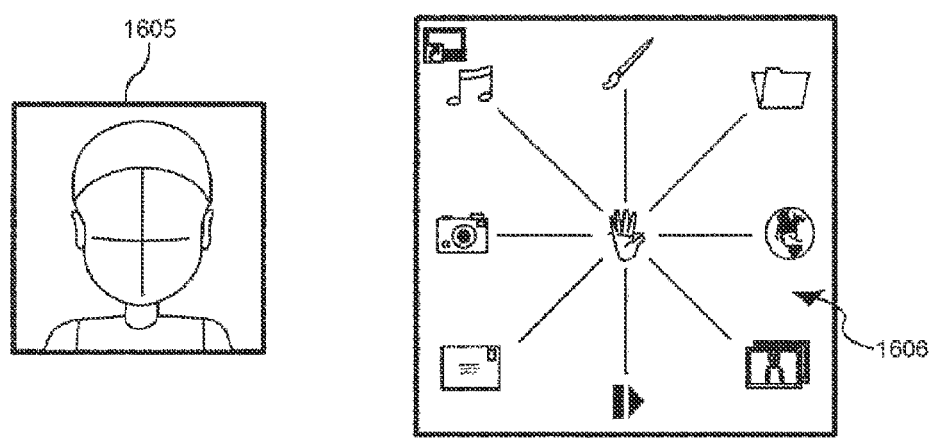
FIG. 16

ENHANCED INPUT USING RECOGNIZED GESTURES

CROSS-REFERENCES TO RELATED APPLICATION

This application is a continuation of U.S. application Ser. No. 14/857,488, entitled "ENHANCED INPUT USING RECOGNIZED GESTURES", filed Sep. 17, 2015 which is a continuation of U.S. application Ser. No. 14/047,851, entitled "ENHANCED INPUT USING RECOGNIZED GESTURES," filed Oct. 7, 2013, which is a continuation of U.S. application Ser. No. 12/038,626, entitled "ENHANCED INPUT USING RECOGNIZED GESTURES," filed Feb. 27, 2008, all of which are hereby incorporated by reference in their entirety for all purposes.

FIELD

The present disclosure generally relates to controls (or widgets).

BACKGROUND

An input device or pointing device is a hardware component that allows a computer user to input data into a computer. A control (or widget) is an interface element that the computer user interacts with, such as by using an input device, to provide a single interaction point for the manipulation of data.

SUMMARY

An example computer-implemented method, according to the disclosure, includes causing a representation of a user to move with respect to a graphical user interface based on input of the user, where the graphical user interface comprises a central region, and interaction elements disposed outside of the central region. The interaction elements are not shown until the representation of the user is aligned with the central region. The computer-implemented method further comprises recognizing a gesture of the user, causing display of the graphical user interface to be altered based on the recognized gesture, and outputting an application control based on the recognized gesture.

The example computer-implemented method can further include one or more of the following features. The gesture can further comprise at least one of a single or multiple finger gesture; a single hand gesture; a single hand and arm gesture; a single hand and arm, and body gesture; a bimanual gesture; a change in a head pose or posture; a change in an eye position; a change in facial expression; or a change in a body pose or posture. The representation of the user can further comprise a cursor, an image, an icon, or an avatar. The graphical user interface can comprise a square shape, a circular shape, or a circular sector shape. Each interaction element can further comprise an icon associated with a candidate application wherein causing display of the graphical user interface to be altered can further comprise causing the icon associated with the recognized gesture to be highlighted, and outputting the application control can comprise outputting an application control for the candidate application associated with the highlighted icon. The gesture can comprise a two- or three-dimensional position displacement, or a transformation without position displacement. Recognizing the gesture can further comprise determining a magnitude and direction of the gesture, causing the display of the graphical user interface to be altered can comprise causing the representation to move based on the determined magnitude and direction, and outputting the application control can further comprise outputting an application control for a selected application associated with an interaction element adjacent to the moved representation. The gesture can comprise an enabling gesture, and the graphical user interface can be displayed based on recognizing the enabling gesture.

Additionally or alternatively, the example computer-implemented method can further include one or more of the following additional features. The method can further include causing the representation of the user to be displayed outside the central region, causing a target image to be displayed in the central region, recognizing, from at least a third image, a realignment gesture, causing the representation of the user to move in relation to the target image based on the realignment gesture, and causing the moved representation to be displayed in the central region if the moved representation aligns with the target image. The graphical user interface can further comprise at least eight interaction elements disposed outside the central region. Recognizing the gesture can further comprise recognizing a first displacement in a first direction, and recognizing a second displacement in a second direction.

Additionally or alternatively, the example computer-implemented method can further include one or more of the following additional features. Causing the display of the graphical user interface to be altered can further comprise causing the graphical user interface to be deactivated. Causing the display of the graphical user interface to be altered can further comprise causing a mouse control mode to be activated. In the mouse control mode, further gestures can be mapped to mouse events. The further gestures can further comprise finger motions. The method can further comprise recognizing an identity of the user, and selecting the interaction elements to show based on the recognized identity. The gesture can be recognized if detected in front of a plane defined at a predetermined distance in front of a camera. Outputting the application control can further comprise interacting with a media center.

An example computer program product, according to the disclosure, is tangibly embodied in a machine-readable medium and comprise instructions that, when read by a machine, operate to cause the machine to cause a representation of a user to move with respect to a graphical user interface based on input of the user, wherein the graphical user interface comprises a central region, and interaction elements disposed outside of the central region. The interaction elements are not shown until the representation of the user is aligned with the central region. The instructions can further operate to cause the machine to recognize a gesture of the user, cause display of the graphical user interface to be altered based on the recognized gesture, and output an application control based on recognized gesture.

An example device, according to the disclosure, includes a user interface configured to display a representation of a user and a graphical user interface where the representation of the user is configured to move with respect to the graphical user interface based on input of the user, and the graphical user interface has a central region and interaction elements disposed outside of the central region. The interaction elements are not shown until the representation of the user is aligned with the central region. The device further has a processor configured to recognize a gesture of the user, cause the display of the graphical user interface to be altered based on the recognized gesture, and output an application control based on the recognized gesture.

An example apparatus, according to the disclosure, includes means for causing a representation of a user to move with respect to a graphical user interface based on input of the user, where the graphical user interface comprises a central region, and interaction elements disposed outside of the central region. The interaction elements are not shown until the representation of the user is aligned with the central region. The apparatus further includes means for recognizing a gesture of the user, means for causing display of the graphical user interface to be altered based on the recognized gesture, and means for outputting an application control based on the recognized gesture.

The details of one or more implementations are set forth in the accompanying drawings and the description, below. Other features and advantages of the disclosure will be apparent from the description and drawings, and from the claims.

BRIEF DESCRIPTION OF DRAWINGS

FIGS. 5 and 11 depict exemplary hand poses or gestures.

FIGS. 6 and 16 illustrate several example control shapes and configurations.

Like reference numbers represent corresponding parts throughout

DETAILED DESCRIPTION

A camera such as a depth camera may be used to control a media computer or hub, using the enhanced control described herein, based on the recognition of gestures or changes in gestures of a user. Unlike touch-screen systems that suffer from the deleterious, obscuring effect of fingerprints, gesture-based input allows photos, videos, or other images to be clearly displayed or otherwise output based on the user's natural body movements or poses. With this advantage in mind, the enhanced control may be extended to recognize other gestures that can manipulate visual output in other ways, to intuitively invoke other media applications or other functions such as functions that play music or other sounds, to interact with other applications, or to navigate in virtual environments or universes.

As used herein throughout, a "gesture" is intended to refer to a form of non-verbal communication made with part of a human body, and is contrasted with verbal communication such as speech. For instance, a gesture may be defined by a movement, change or transformation between a first position, pose, or expression and a second pose, position or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, or a finger pointing gesture. A gesture may be detected using a camera, such as by analyzing an image of a user, using a tilt sensor, such as by detecting an angle that a user is holding or tilting a device, or by any other approach.

A body part may make a gesture (or "gesticulate") by changing its position (i.e. a waving motion), or the body part may gesticulate without changing its position (i.e. by making a clenched first gesture). Although the enhanced control uses, as examples, hand and arm gestures to effect the control of functionality via camera input, other types of gestures may also be used.

Figure 1:
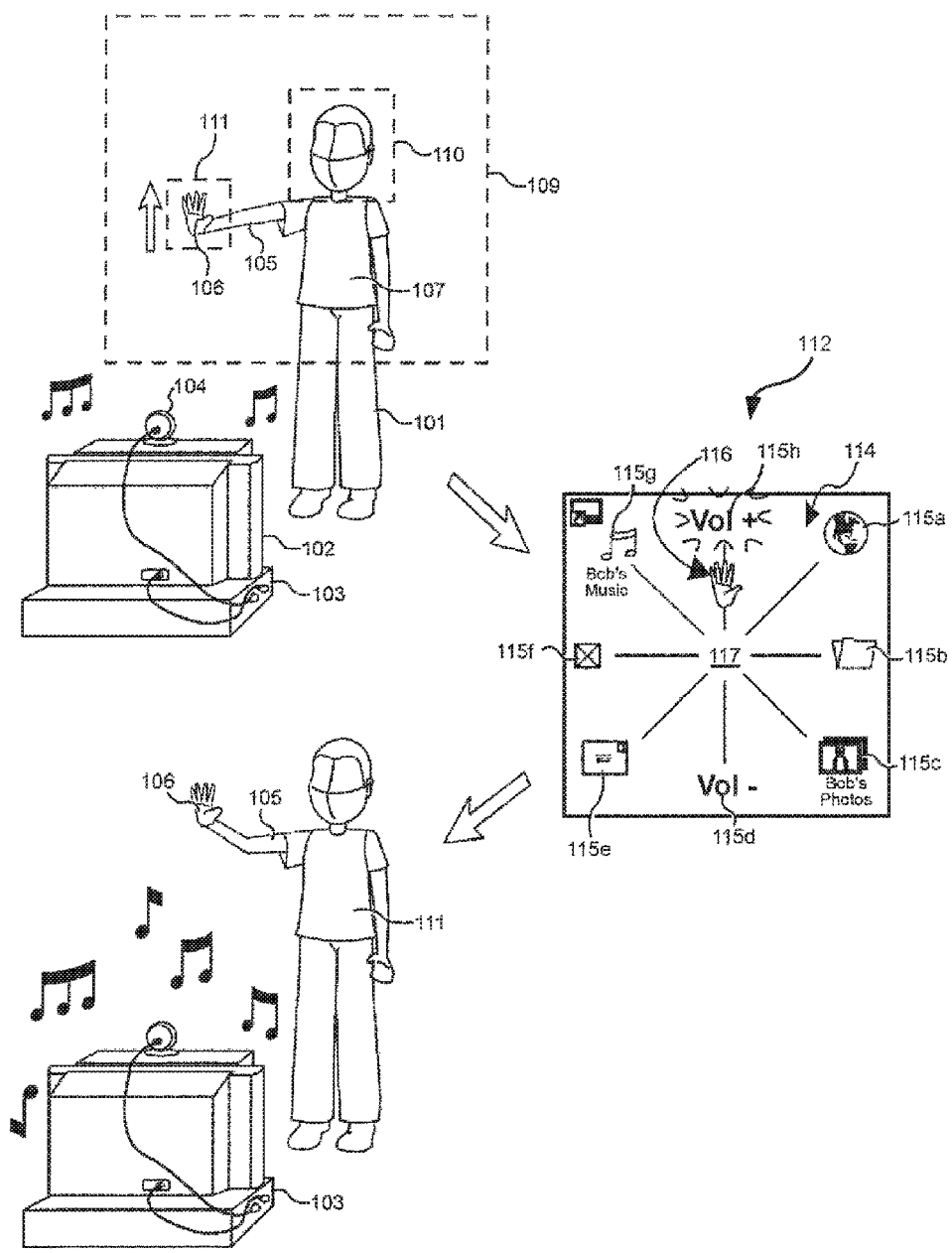
FIG. 1 is a contextual diagram demonstrating enhanced input using recognized gestures.

FIG. 1 is a contextual diagram demonstrating enhanced input using recognized gestures. In FIG. 1, user 101 ("Bob") is standing in front of a display 102 of a media hub 103 and a camera 104, listening to music played at a soft volume. The user's right arm 105, right hand 106, and torso 107 are within the field-of-view 109 of the camera 104.

To indicate his desire to have the media hub 103 raise the volume of the music, the user 101 gesticulates by extending his right arm 105 and right hand 106 toward the camera 104 and in front of his torso 107, and moving his right arm 106 in an upward motion. The media hub 103 recognizes the palm-forward, finger extended pose of the user's right hand 106 as signifying that a gesture-based control input is forthcoming. Put another way, if the user's right hand 106 did not form the palm-forward, fingers extended pose (e.g. if the user's right hand 106 were curled in a ball), the media hum 103 may ignore the user's motions or gestures.

From a portion 110 of an image, the face of the user 101 is detected and recognized, identifying the user 101 as "Bob." From a portion 111 of the image, a pose of the hand 106, in this case a pose in which the palm is forward, and all five fingers are fully extended and separated, is detected. From a second image, the change in position of the hand 111 is also detected or otherwise determined, allowing for the automatic determination or recognition of the gesture performed by the upward arm motion of the arm 105.

An enhanced control 114 is displayed in a user interface 112. In this example, the wheel-shaped enhanced control 114 includes eight interaction elements 115, each associated with one or more icons, functions, and applications. For instance, interaction element 115a is associated with a web browser function, interaction element 115c is associated with a user-specific photo album function, interaction element 115d is associated with a VOLUME DOWN function, interaction element 115e is associated with an e-mail function, interaction element 115f is associated with a DISABLE CONTROL function, interaction element 115g is associated with a user-specific music function, and interaction element 115h is associated with a VOLUME UP function. The interaction elements 115 may be universal to all users of the media hum 103, or they may be determined or selected based on a recognized identify of the user 101.

Although the enhanced control 114 is illustrated with a two-dimensional wheel with a hub-and-spoke appearance, in other implementations other shapes can be used. For instance, the enhanced control 114 may be linear, triangular, three-dimensional, square, or the enhanced control 114 may occupy a circular sector. The enhanced control 114 may be generally asymmetrical or symmetrical.

Additionally, the enhanced control 114 need not be aligned at the center of the user interface 112, or be fixed at a single position within the user interface 112 at all. For instance, as the user interface 112 displays other objects than the enhanced control or regions of the user interface 112 become obfuscated, the enhanced control may dynamically reposition itself, change it's shape, or change the number of interaction elements displayed. Further, in addition to being dynamically chosen for a particular recognized user or may be uniformly selected for all users, and fewer or more then the illustrated number of interaction elements may be chosen.

Based upon the recognized 'upward motion of the arm 105' gesture, a representation 116 (in this case, a hand-shaped cursor) moves from central region 117 of the control 114 to overlap or be adjacent to interaction element 115h, thereby causing an interaction with the interaction element 115h. Such an interaction calls, invokes or otherwise executes the VOLUME UP function associated with the interaction element 115h, further causing the volume of the music output by the media hub 103 to increase.

Figure 2:
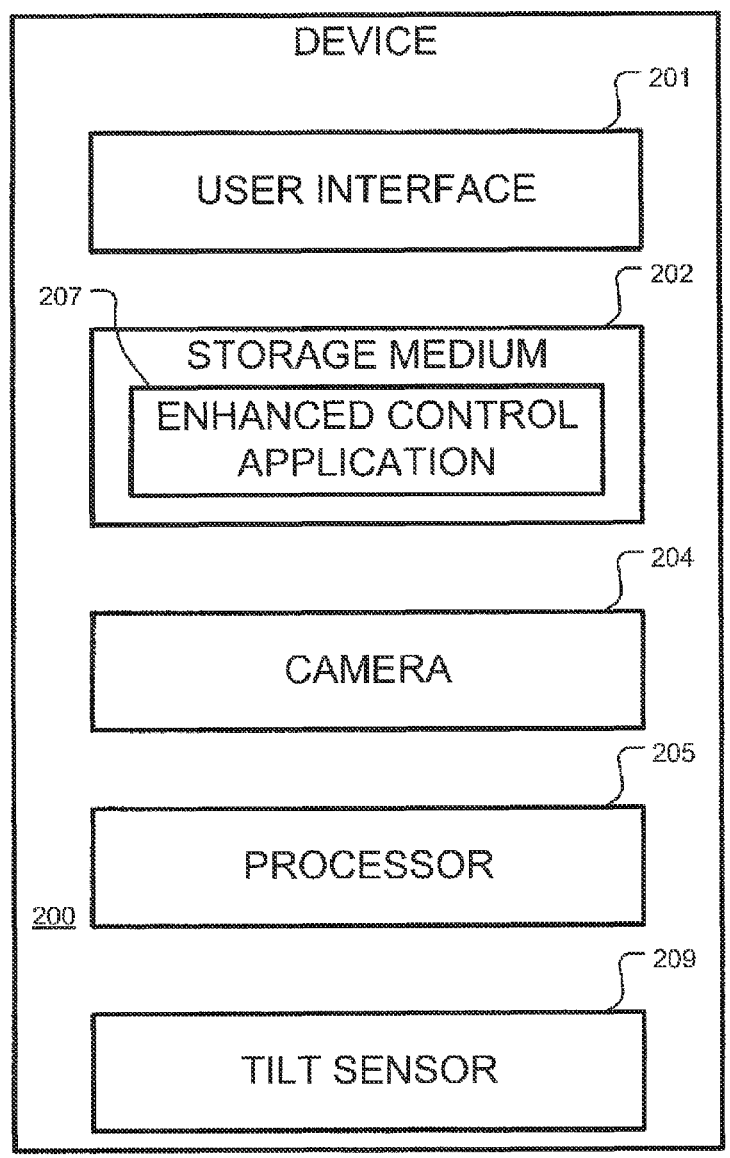
FIG. 2 is a block diagram of an exemplary device.

FIG. 2 is a block diagram of a device 200 used to implement enhanced input. Briefly, and among other things, the device 200 includes a user interface 201, a storage medium 202, a camera 204, a processor 205, and a tilt sensor. The user interface 201 is a mechanism for allowing a user to interact with the device 200, or with applications invoked by the device 200. The user interface 201 may provide a mechanism for both input and output, allowing a user to manipulate the device or for the device to produce the effects of the user's manipulation. The device 200 may utilize any type of user interface 201, such as a graphical user interface (GUI), a voice user interface, or a tactile user interface.

The user interface 201 may be configured to render a visual display image. For example, the user interface 201 may be a monitor, a television, a liquid crystal display (LCD), a plasma display device, a projector with a projector screen, an autostereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including an object or representation such as an avatar.

The storage medium 202 stores and records information or data, an may be an optical storage medium, magnetic storage medium, flash memory, or any other storage medium type. Among other things, the storage medium is encoded with an enhanced control application 207 that effects enhanced input using recognized gestures.

The camera 204 is a device used to capture images, either as still photographs or a sequence of moving images. The camera 204 may use the light of the visible spectrum or with other portions of the electromagnetic spectrum, such as infrared. For example, the camera 204 may be a digital camera, a digital video camera, or any other type of device configured to capture images. The camera 204 may include one or more cameras. In some examples, the camera 204 may be configured to capture images of an object or user interacting with an application. For example, the camera 204 may be configured to capture images of a user or person physically gesticulating in free-space, or otherwise interacting with an application within the field of view of the camera 204.

The camera 204 may be a stereo camera, a time-of-flight camera, or any other camera. For instance the camera 204 may be an image detector capable of sampling a background image in order to detect motions and, similarly, gestures of a user. The camera 204 may produce a grayscale image, color image, or a distance image, such as a stereo camera or time-of-flight camera capable of generating a distance image. A stereo camera may include two image sensors that acquire images at slightly different viewpoints, where a processor compares the images acquired from different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connection to and in operable communication with, over a wireline or wireless pathway, the camera 204 and the user interface 201, and is configured to control the operation of the processor 205 to provide for the enhanced control. In one configuration, the device 200 uses the processor 205 or other control circuitry to execute an application that provides for the enhanced camera-based input.

Although the device 200 has been described as a personal computer (PC) or set top box, such a description is made merely for the sake of brevity, and other implementations or manifestations are also contemplated. For instance, the device 200 may be implemented as a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, or any other type of electronic device that includes a processor or other control circuitry configured to execute instructions, or any other apparatus that includes a user interface.

In one example implementation, input occurs by using a camera to detect images of a user performing gestures. For instance, a mobile phone can be placed on a table and may be operable to generate images of a user using a face-forward camera. Alternatively, the gesture may be recognized or detected using the tilt sensor 209, such as by detecting a "tilt left" gesture to move a representation left and to select an interaction element disposed on the left side of a control, or by detecting a "tilt forward and right" gesture to move a representation up and to the right of a neutral position, to select an interaction element disposed on an upper right side of a control.

The tilt sensor 209 may thus be any type of module operable to detect an angular position of the device 200, such as a gyroscope, or a camera-based optical flow tracker. In this regard, image-based input may be supplemented with or replaced by tilt-sensor input to perform functions or commands desired by a user. Put another way, detection of a user's gesture may occur without using a camera. By moving the device in the same kind of stroke pattern that is visualized on the control on the user interface, the user is enabled to control the same interface or application in a straightforward manner.

Figure 3:
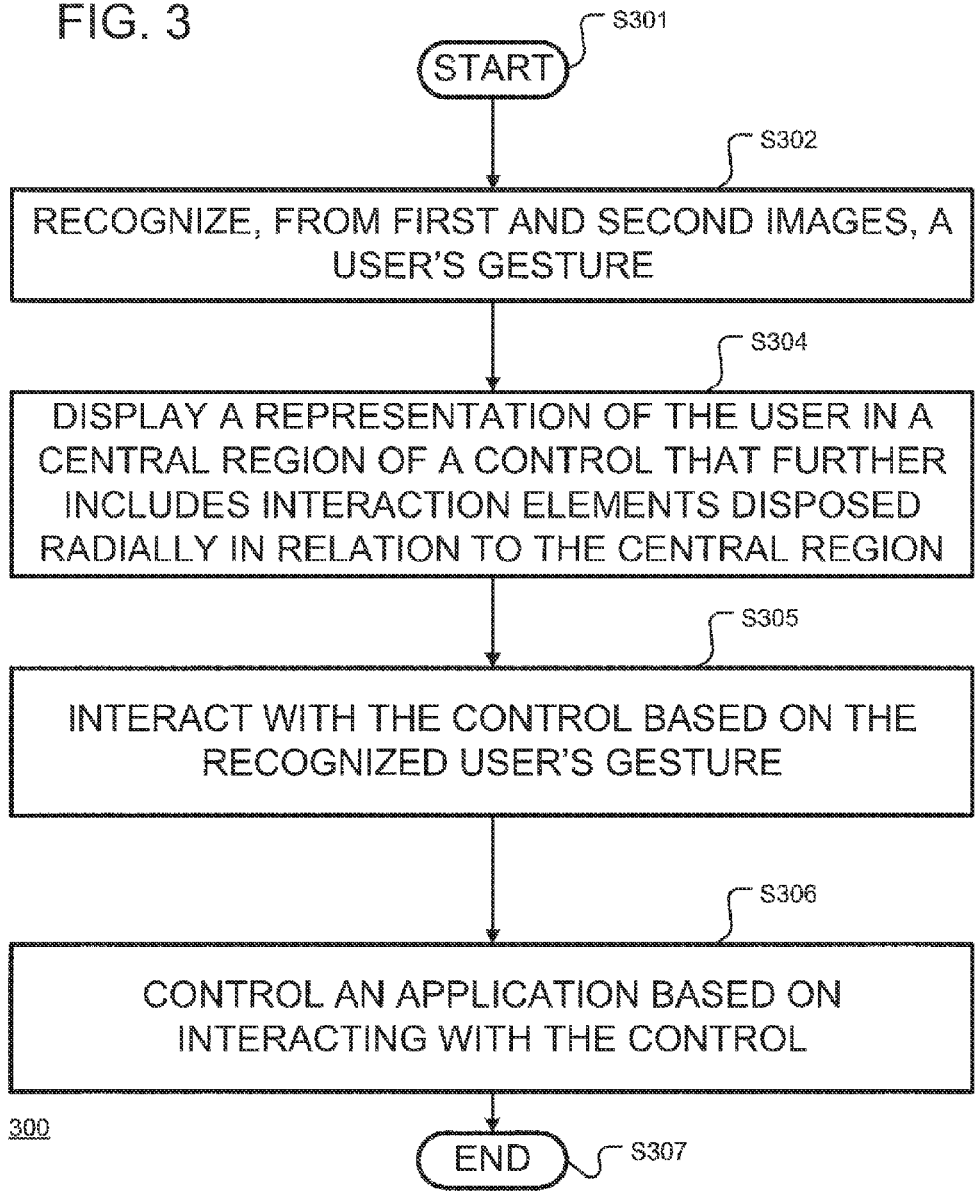
FIGS. 3 and 17 are flowcharts of exemplary processes.

FIG. 3 is a flowchart illustrating a computer-implemented process 300 that effects enhanced input using recognized gestures. Briefly, the computer-implemented process 300 includes recognizing, from first and second images, a user's gesture, and displaying a representation of the user in a central region of a control that further includes interaction elements disposed radially in relation to the central region. The process also includes interacting with the control based on the recognized user's gesture, and controlling an application based on interacting with the control.

In further detail, when the process 300 begins (S301), a user's gesture is recognized from first and second images (S302). The first and second images may be derived from individual image snapshots or from a sequence of images that make up a video sequence. Each image captures position information that allows an application to determine a pose, position, expression, stature, or other state of a user or portion of the user.

Accordingly, from the two images, the gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in an eye position; a change in a facial expression; a change in a body pose or posture, or a transformation of any other expressive body state.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger may be the control object. The user's gesture in a single image or between two images may be expressive of an enabling or "engagement" gesture.

There are many ways of determining a user's gesture from a camera image. For instance, the gesture of "drawing a circle in the air" or "swiping the hand off to one side" may be detected by a gesture analysis and detection process using the hand, arm, body, head or other object position information. Although the gesture may involve a two- or three-dimensional position displacement, such as when a swiping gesture is made, in other instances the gesture includes a transformation without a concomitant position displacement. For instance, if a hand is signaling "stop" with five outstretched fingers and palm forward, the pose of the user changes if all five fingers are retracted into a ball with the palm remaining forward and thus a gesture is expressed, even if the overall position of the hand or arm remains static.

Gestures may be detected using heuristic techniques, such as by determining whether the hand position information passes explicit sets of rules. For example, the gesture of "swiping the hand off to one side" can be identified if the following gesture detection rules are satisfied: (1) the change in horizontal position is greater than a predefined distance over a time span that is less than a predefined limit; (2) the horizontal position changes monotonically over that time span; (3) the change in vertical position is less than a predefined distance over that time span; and (4) the position at the end of the time span is nearer to (or on) a border of the hand detection region than the position at the start of the time span.

Some gestures utilize multiple rule sets that are executed and satisfied in an explicit order, where the satisfaction of a rule set causes a system to change to a state where a different rule set is applied. This system may be unable to detect subtle gestures, in which case Hidden Markov Models may be used, as these models allow for chains of specific motions to be detected, but also consider the overall probability that the motions sufficiently fit a gesture.

An engagement gesture activates or invokes functionality that monitors other images for gesture-based command inputs, and ignores random or background body motions. In one example, the engagement gesture is a specific hand pose or hand motion sequence gesticulated in a tracking region of a camera in front of a display that is held for a predetermined amount of time. One example gesture is a hand pose in which the hand is held in an upright position with all fingers and thumb spread apart widely.

In addition to body, arm, or hand gestures, finger pointing gestures can be recognized from one or more images. For instance, a "point left" gesture can be made with the tip of a user's finger and detected by analyzing an image of a finger. Fingerprint analysis or other approaches can be used to determine the direction of a pointing fingertip. In other example implementations, and as noted above, a gesture can be detected without using a camera, such as where the gesture is a verbal gesture or is detected using a tilt sensor or accelerometer.

Figure 4:
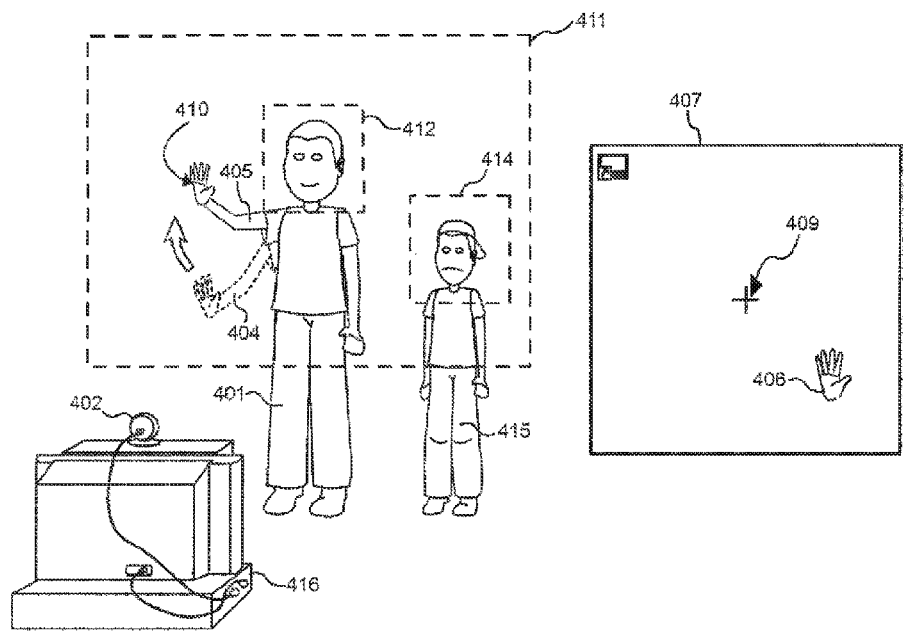
FIGS. 4, 7 to 10 and 12 to 15 illustrate exemplary gestures and concomitant control interactions.

FIG. 4 illustrates an exemplary engagement gesture and a user interface that results from the engagement gesture. In particular, two images of the user 401 captured by the camera 402 capture the user's arm gesticulating from a downward first position 404 to an extended, palm-facing-forward second position 405. The performance of this gesture by the user 401 causes a representation 406 of the user to be displayed within the user interface 407, as well as a target image 409 (cross-hairs) to be displayed in the center of the user interface 407. As described in further detail below, since, upon performing the gesture, the hand 410 of the user is not centered in the field-of-view 411 of the camera 402, the representation 406 appears in the lower right corner of the user interface 407, potentially invoking a realignment process.

In addition to recognizing gestures or changes in gestures, other information may also be determined from the images. For example, a facial detection and recognition process may be performed on the images to detect the presence and identity of users within the image. Identity information may be used, for example, to determine or select available options or interaction elements to display, or to determine which of many users within an image is to be designated as a controlling user if more than one user is attempting to engage the input functionality.

In FIG. 4, a facial detection process identifies regions 412 and 414 that include faces, and a facial recognition process determines the identities of the adult user 401 and the child (or unidentified) user 415. From this determined identity information, the device may determine that a child is present or that the user 401 has a higher priority than the user 415, and may thus display fewer options to the user via the control, or may disallow the child user 415 from wresting control of the device 416 from the adult user 401.

If the user 401 has a higher priority than the user 415, the user 401 may make a gesture that transfers control to the user 415, or that authorizes the user 415 to wrest control. For instance, the user 401 may make a "pat on the head" gesture of user 415, thereby providing transferring control of the device to the user 415. Subsequent gestures by the user 401 until the user 401 regains control via active (e.g. regesticulating) measures or passive (e.g. time-out) measures.

In addition to selectively recognizing users' gestures based on the identity of the user, other criteria can be used to filter out irrelevant or unintentional "candidate" gestures, such as potential control gestures. For example, a plane may be defined at a predetermined distance in front of a camera, where gestures that are made or performed on the far side of the plane from the camera are ignored, while gestures or potential gestures that are performed between the camera and the plane are monitored, identified, recognized, filtered, and processed as appropriate. The plane may also be defined relative to another point, position or object, such as relative to the user's torso.

So as to enable the input of complex commands and to increase the number of input options, the process for recognizing the user's gesture may further include recognizing a first displacement in a first direction, and recognizing a second displacement in a second direction, and aggregating these multiple displacements as a single gesture. Furthermore, the recognition of the user's gesture may determine a magnitude and direction of the user's gesture.

Figure 5:
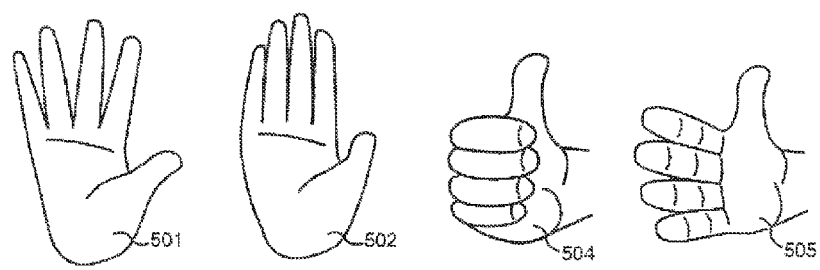

Although a fingers-extended, palms-facing-forward hand pose, shown as pose 501 in FIG. 5, is illustrated and described herein as an exemplary controlling hand pose, other hand poses, or changes or transitions between hand poses, may also be recognized in a similar manner as engagement poses or gestures. Other hand poses that may be used to denote control or engagement include, for example, fingers-upright, palms-facing-forward hand pose 502; thumbs-up, fingers curled hand pose 504; and fingers-extended-forward, thumbs-up hand pose 505.

Returning briefly to FIG. 3, a representation of the user may be displayed in a central region of a control that further includes interaction elements disposed radially in relation to the central region, such as when the enabling gesture is performed and recognized (S304). The representation of the user may be displayed to a novice user to prompt the user to interact with the interface, but may not be displayed for expert users who are familiar with performing the gestures. The interface may be configured by a user to display or not display a representation of the user, such as by displaying a representation of the user in a tutorial mode, and not displaying the representation in a normal mode or an advanced mode. The interface may display a representation if a user performs an engagement gesture but does not perform a gesture to select an item within a time limit.

The shape and configuration of the control may vary depending on a particular context, for example to be circular, square shaped, symmetrical or asymmetrical, linear, polygonal, odd-shaped, or to take on the shape of a circular sector, where the one or more interaction elements are disposed adjacent to the central region. In the case where control is circular and the interaction elements are radially oriented, the control may be referred to as a "gesture wheel."

An example gesture wheel includes eight points of the compass associated with eight different functions, represented as icons. The wheel may be centered on a target location, such as a location at the center of a user interface or in an otherwise blank area of the user interface, such that the user can simply move the control object of their body in the general direction of the function they intend to invoke, in order to invoke that function by their directional motion. Another example gesture wheel includes fewer or more than eight interaction elements, or includes a variable number of interaction elements. For instance, the gesture wheel may include a single interaction element, ten interaction elements, or dozens, hundreds, or thousands of interaction elements.

A blank region determination function may iteratively locate a blank region of the screen, dynamically select a control shape and size, and present the dynamically selected control within the iteratively located blank region. For instance, the control may repeatedly adjust itself to avoid overlapping a moving image in the user interface, such as a simulated bouncing ball.

Figure 6:
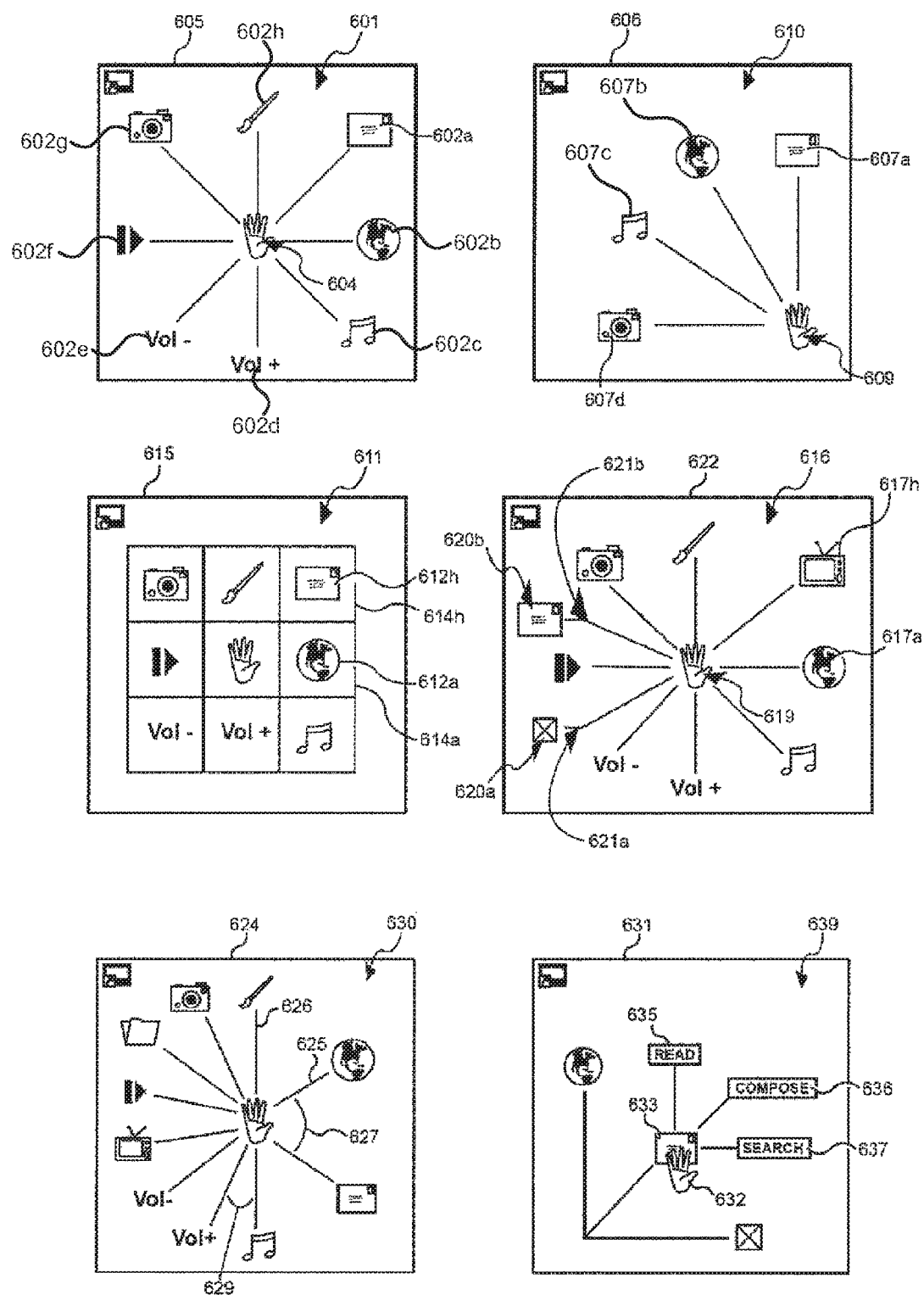

FIG. 6 illustrates several example shapes and configurations of the enhanced control. Control 601 is a circular control including eight icons 602a to 602h emanating, hub-and-spoke fashion, from a central region 604. The central region 604 is generally aligned with the center of the user interface 605. Control 606 is a circular sector-shaped control, occupying a 90° sector, including four icons 607a to 607d also emanating, hub-and-spoke fashion, from a central region 609 located adjacent to the lower right corner of the user interface 610.

Control 611 is a square-shaped control including eight icons 612a to 612h located in block-shaped interaction regions 614a to 614h around a center region that is generally aligned with the center of the user interface 615. Control 616 is a generally circular-shaped and includes eight icons 617a to 617h emanating, hub-and-spoke fashion, from a central region 619, as well as two icons 620a and 620b that emanate from center region 619 along complex paths 621a and 621b on user interface 622.

Paths 621 are "complex" as they are not solely linear and may require that a user gesticulate in more than one direction in order to activate an icon. For instance, activation of the icon 620b may occur when the user gestures upward and to the left for a certain distance, then gestures left without an upward motion. Also notably, icon 620a is associated with a DISABLE CONTROL icon and function that, when invoked, effects to disable or turn off the control 616.

An interaction element includes any portion of the control that is associated with one or more functions or applications. For instance, each interaction element may include an icon that, when selected, invokes an application. If the control includes more than one interaction element, the applications that may be selected by way of the control are each referred to as "candidate" application.

In one configuration where the control is circular, an interaction element can be spoke-like, appearing as a line emanating from the center of the control and terminated by an icon that invokes a function or application. In this case, small gestures, such as those caused by body jitter, may be ignored or may be ineffective at invoking an application associated with the interaction element, unless the magnitude of the small gesture is sufficient to cause the representation to travel the entire length of the spoke to reach the icon disposed at the far end of the spoke.

In another application where the control is pie-shaped, the interaction element may define a circular sector (pie-shaped) region, such that any motion (or motion that exceeds a threshold) of the representation into the interaction element will cause the interaction element to invoke a function or application. The threshold may be effected by defining a visible or invisible guide-line separating the central region from the interaction elements (or an outer portion of the interaction elements), where a guideline is selected based on proximity to the representation as the representation crosses the guideline. Such a configuration may allow for quicker selection of an interaction region, and may require less precision of motion by the user, or computational expense by the application to recognize fine motion.

The threshold may be a function of distance and/or speed. Specifically, a threshold multiplier may adapt to a user's style over a period of time, based upon the distance and speed that the user has performed previous gestures recorded over a period of time. Alternatively, the threshold-multiplier may adapt to a user's style while the gesture is being performed, based on the speed observed during the gesture. The threshold distance may be extended if the user moves more quickly (for users whose style is to flail their arms wildly), or shortened if the user moves more slowly (for users whose style is more deliberate). The threshold distance may be set according to the average distance is user has moved while performing previous gestures.

The radius and angle of the spokes may vary according to the likelihood that an item will be selected, so that it is easier to select a likely item or interaction element. Specifically, and as show in user interface 624, the radius of the spoke 625 of a likely or popular item may be shorter than the spoke 626 associated with a normal item. Furthermore, there may be greater angle 627 between the likely items than an angle 629 between less popular items, thereby making it easier to select the likely item. The likelihood associated with of an item on the control 630, and thereby the property of its spoke, may depend on the popularity of the item, dynamically based on how many times the user has recently accessed the item, dynamically based on statistics about how many times a larger sampling of users have accessed the item, predetermined based on an expectation of use of the item, or predetermined based on which items a vendor wants to promote.

In addition to basing the spacing and angle of a control based on popularity, these and other qualities of a control may depend on a user's gesture or a part of a gesture. For example, the if the user makes a waving gesture to the right, the items on the right may spread out so that they are easier to select, as shown in user interface 624. The user may then adjust the path of their gesture to follow a dynamically aligned interaction element, therefore resulting in a curved gesture path.

A particular interaction element may reveal other interaction elements, revealing or defining complex paths. For instance, a parent interaction element may represent a category of functions, and when parent interaction element is selected, child interaction elements representing the each of the category of functions may be revealed to radiate from the parent first interaction element. For instance, in user interface 631, when the representation 632 hovers over the mail icon 633 (i.e. the parent interaction element), a read mail icon 635, a compose mail icon 636, and a search mail icon 637 (the child interaction elements) spawn, or radiate from the selected mail icon 633.

In an initial state prior to selecting the mail icon 633, the control 639 may be centered within the user interface 631, where the control 639 may be moved to a corner to allow for easier selection of the child interaction elements when one of the mail icon 633 is selected. Alternatively, the control 639 may, in the initial state, already be disposed in the corner of the user interface 631.

In this regard, a complex path may be defined to include a motion in a direction of a parent interaction element followed by a motion in a direction of a child interaction element item. When the child items are revealed, siblings of the parent may vanish from the screen, allowing the selection of more items than whose icons would normally fit on the screen. For example, in a state prior to selecting the mail icon 633, the control 639 may include many more interaction elements and may, for example, have the visual appearance similar to the control 601.

In one implementation, the enabling gesture may result in the control object (i.e. hand) of the user's body being disposed in an awkward position. For instance, as a result of a "swiping" enabling gesture, the user's hand may lie near the boundary of or outside of a camera's field of view. In these and other circumstances, a process may occur to orient or align the user's control object with a target position (in free space) that eases or improves future gesture recognitions. The target position in free space may be predefined, such as a center position of the camera's field of view, or the target position may be dynamically determined, for instance in a well-lit position, or an area of high contrast or without a complex background, or in a region of the field of view away from other moving objects.

One approach for aligning the user's position for improved gesture recognition is to display the representation and a target image on the user interface or on the control, to infer to or guide the user to move the representation through motion of their body, so that the representation aligns with the target image. Thus, the representation of the user may initially be displayed outside the central region, and a target image may be displayed in the central region.

In other images, a realignment gesture may be recognized, the representation may be moved in relation to the target image based on the realignment gesture. If the moved representation aligns with the target image, the representation will be displayed in the central region. Realignment may assure the user's hand remains in the camera's field of view, or may also assure the user has enough reach of the arm to perform the gestures in one or more directions.

Figure 7:
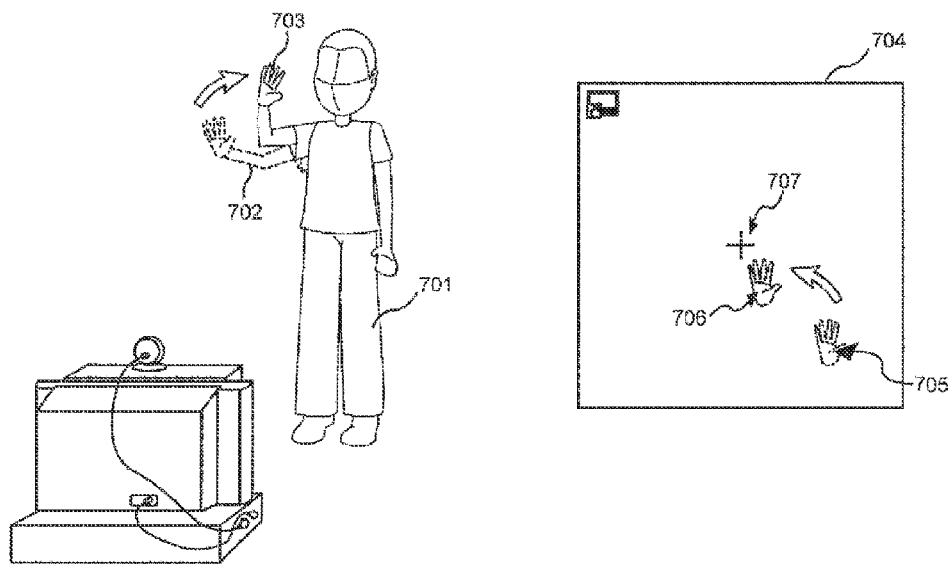

FIG. 7 illustrates an exemplary realignment gesture, in which a user 701 gesticulates his arm upward and left from a first position 702 to a second position 703, thereby causing the representation in the user interface 704 to also move from a first position 705 to a second position 706. As the second position 706 aligns with the target image 707 at the center of the user interface 707, the gesticulation will cause the enhanced control to initially appear. As the user subsequently gesticulates to interact with the enhanced control further realignments processes may be carried out to reorient the control object to a desired position with the field of view.

In another configuration, a mouse cursor may be displayed at a position of the user interface corresponding to a position of the control object in free space. Alternatively, the control itself may be moved away from, or initially generated at a position other than the center of the user interface. For instance, if, as a result of the enabling gesture, the user's hand is located at the far left and far upper position of a camera's field of view, the control may be generated as a 90° circular sector radiating from the top right and far upper position on the user interface. In such a case, the same number of or fewer interaction elements may be displayed, as compared to the situation where the control would have been centered on the user interface and completely surrounded by interaction elements.

In any case, and returning to FIG. 3, once the representation has been displayed within the center region of the control, the interface is enabled for gesture control. Based on the recognized user's gesture, an interaction with the control occurs (S305). The recognized user's gesture may cause the representation to move away from the center region of the control in a direction and magnitude based on the direction and magnitude of the user's motion in free-space, causing the representation to overlap one or more interaction elements.

The magnitude may also be a function of distance and speed. A magnitude-multiplier may adapt to a user's style over a period of time, based upon the distance and speed that the user has performed previous gestures recorded over a period of time. Alternatively, the magnitude-multiplier may adapt to a user's style while the gesture is being performed, based on the speed observed during the gesture. The magnitude-multiplier may be decreased if the user moves more quickly (for users whose style is to flail their arms wildly), or increased if the user moves more slowly (for users whose style is more deliberate).

Similar to a mouse event, when the representation overlaps or selects a particular interaction element, the control may become disabled, the underlying interaction element or icon may become highlighted, one or more of the applications or functions associated with the underlying interaction element may be invoked, executed, loaded, pre-loaded or otherwise run, an alternate mode (such as a "mouse control mode") may be activated, or nothing may occur at all other than to display the representation overlapping a portion of the control.

Figure 8:
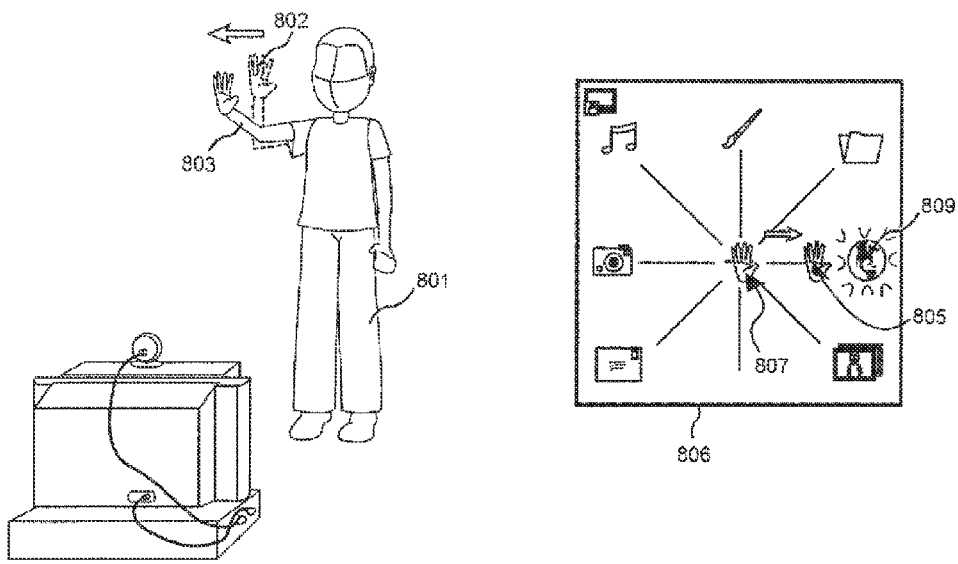

FIG. 8 illustrates an exemplary gesture and concomitant control interaction. Specifically, a user 801 gesticulates his arm from a first position 802 to a second position 803, thereby causing representation 805 in user interface 806 to move right from the center position 807 and to highlight icon 809 of an interaction element disposed to the right of the center region. The selection and highlighting of the icon 809 may mimic a mouse-over or mouse-down event, causing the execution of an application associated with the icon 809 (such as a web browser application). Irrelevant motions of the user 801, such as the slightly downward motion of the arm in the second state 803, may be filtered or ignored, such as after referencing an anatomical model.

Figure 9:
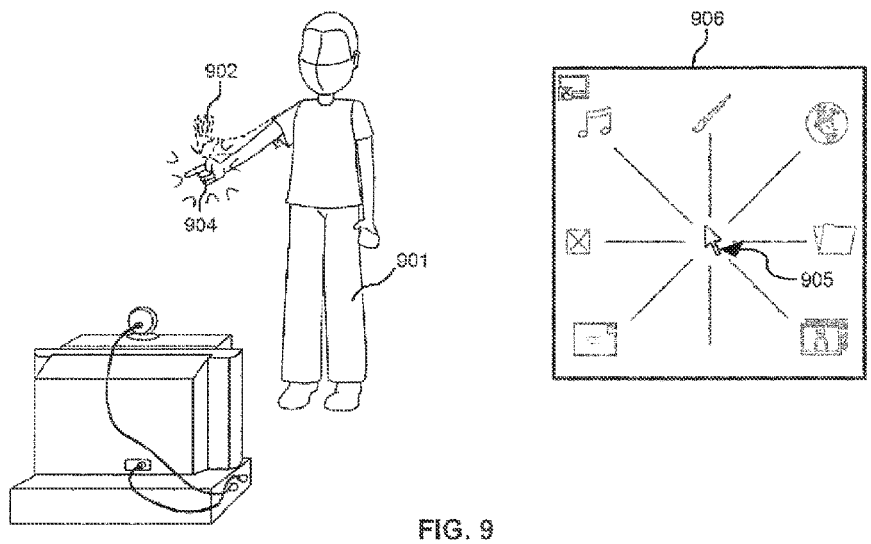

In the mouse control mode, further gestures such as finger motions are mapped to mouse events. For instance, and as shown in FIG. 9, if the user 901 determines that they would rather move to desktop control of a mouse cursor, then instead of sweeping their hand toward an interaction element, they could instead collapse a five fingered hand pose 902 into a pointing finger hand pose 904 to invoke the mouse control mode. Mouse control mode may be visualized by substituting a different representation, such as where arrow cursor 905 is substituted for another non-mouse-control-mode representation in the user interface 906.

Figure 10:
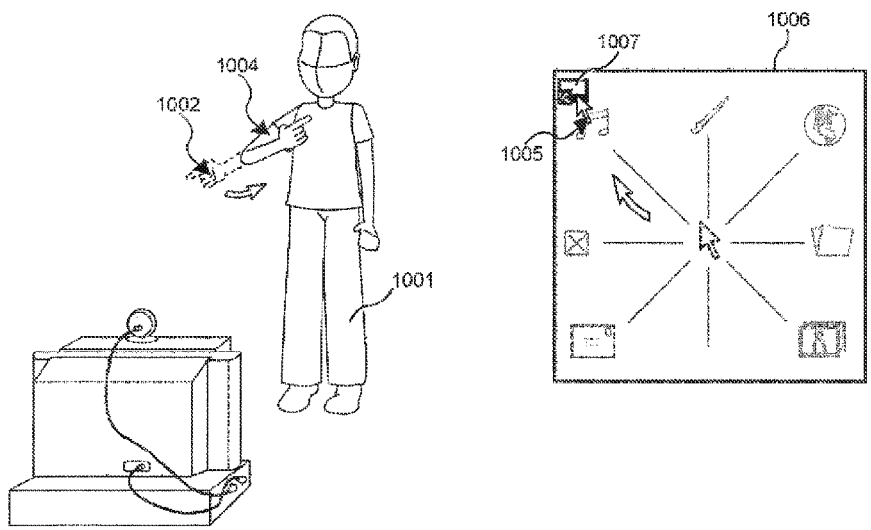

In the mouse control mode, a tracking system signals the control to disappear from the screen or to become disabled (such as by completely disappearing, by becoming more transparent, or by being grayed out), and the mouse cursor appears at the tracked mouse location based on the hand and/or finger position of the user as the user moves their hand around the display. As shown in FIG. 10, once the mouse control mode is activated, the user 1001 may move his arm and pointed hand up and to the left, from a first position 1002 to a second position 1004, causing representation 1005 in the user interface 1006 to move toward the desktop icon 1007.

Other hand poses and gestures may also be used to emulate mouse or keyboard events. For instance, and as shown in FIG. 11, a pointed-forefinger, thumbup gesture 1101 may emulate a mouse-down event, a pointed-forefinger, thumb-down gesture 1102 may emulate a mouse-up event, a hand-chopping gesture 1104 may emulate a cancel or escape event or a double-click event, and a thumb-up, curled finger gesture 1105 may emulate a single-mouse-click event.

In additional examples, to effect a mouse-down event, the user may raise their thumb above their pointing finger in the classic "gun" pose. To effect a mouse-up event, the user may lower their thumb back to its resting position. To effect a right-click event, the user may hold the "mouse down" pose for a preset time without moving their hand and invoke the right click menu. The mouse cursor position may be filtered to prevent the position of the mouse cursor from inadvertently moving while the user gesticulates a mouse-down or mouse-up gesture. For example, the cursor position may be momentarily returned to the position at the start of the detected gesture while the mouse-up or mouse-down event is executed.

In another exemplary gesture set, the thumb-down gesture 1102 may emulate a mouse-down event and a thumb-up gesture 1101 may emulate a mouse-up event. Bending the finger down may emulate a mouse-down event, and straightening the finger may emulate a mouse-up event. A right-click may be emulated using a similar gesture involving a different fingers, or multiple fingers. Clenching the hand in a "grabbing" motion, where closing the hand may emulate a mouse-down event and opening the hand may emulate a mouse-up event. This exemplary gesture set may be intuitive because dragging is performed by grabbing and pulling, and may have sufficient accuracy despite the fact that there is no finger pointing, and that the hand size changes.

Furthermore, although the palm-forward, fingers-extended hand poses has been described above as an example engagement gesture and finger-pointed, thumb-up hand pose has been described as a mouse-down gesture, other configurations are possible. For instance, the palm-forward, fingers extended hand pose may be used to generate a mouse-down event, by closing the hand in a grabbing motion to signify a mouse-down event, and by opening the hand to signify a mouse-up event. In this regard, specific hand gestures used may be adjusted so that signified commands feel natural to a user.

Figure 12:
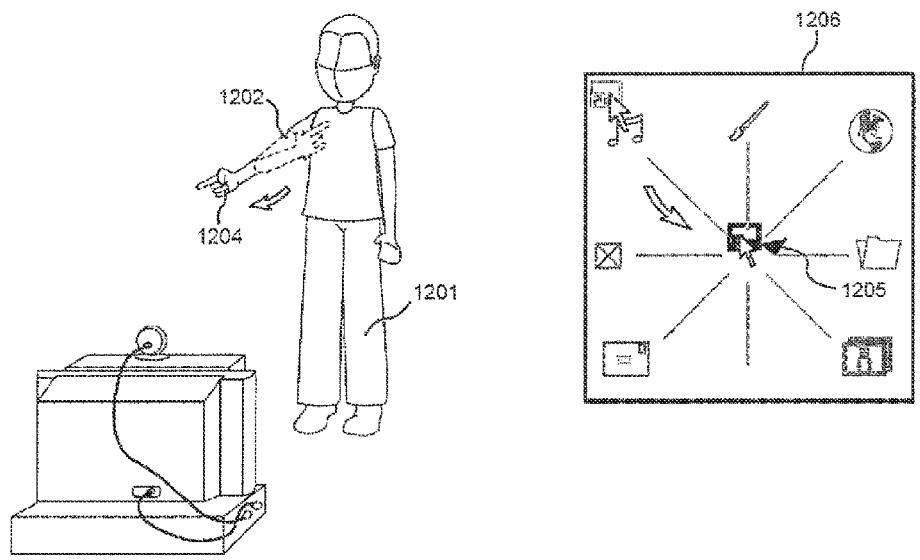

As illustrated in FIG. 12, to effect a mouse-drag event, the user may keep their hand in the "mouse down" pose while moving their hand around the tracking region to move the mouse accordingly. Specifically, a user 1201 moves his arm down and to the left from a first position 1202 to a second position 1204 while holding the mouse-down, finger-pointed pose, to grab the desktop icon 1205 and move it toward the center of the user interface 1206. To perform "multi-touch" control actions, the user may introduce a second hand to the tracking region, and use the thumb moves to perform "clicks" with this extra available tracking element.

Returning to FIG. 3, an application, such as a media center application, is controlled based on interacting with the control (S306), thereby ending the process 300 (S307). Controlling the application may further include controlling a candidate application associated with a highlighted or selected icon, or associated with an interaction element adjacent to a moved or re-aligned representation.

Figure 13:
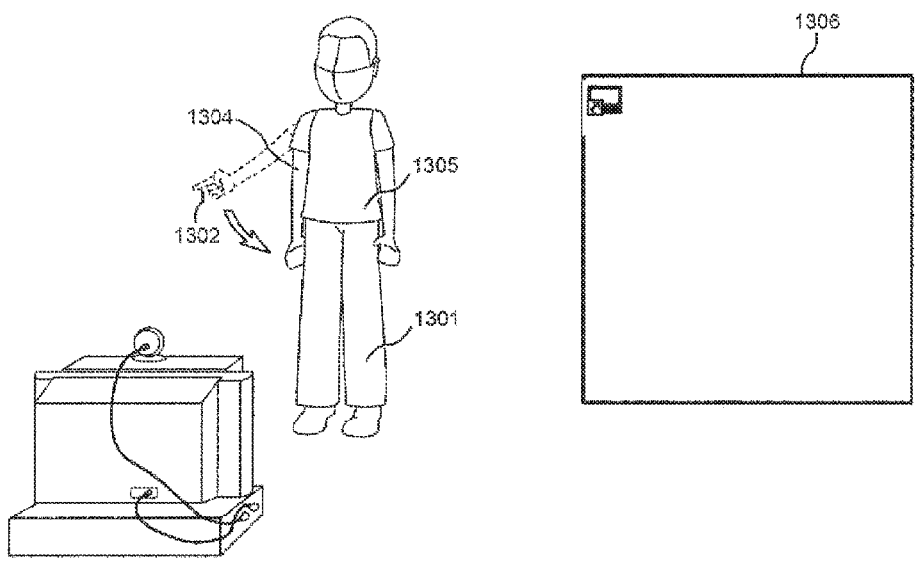

It may be that the user intends to disable, disengage or deactivate the enhanced control. One approach is to use a hand pose or hand pose plus hand motion to turn off gesture control until the engagement gesture is to be reactivated. In FIG. 13, for example, the user 1301 drops his arms from a controlling, first position 1302 to a collapsed or relaxed position adjacent to his torso 1305. Such a motion causes the control to disappear from the user interface 1306.

Figure 14:
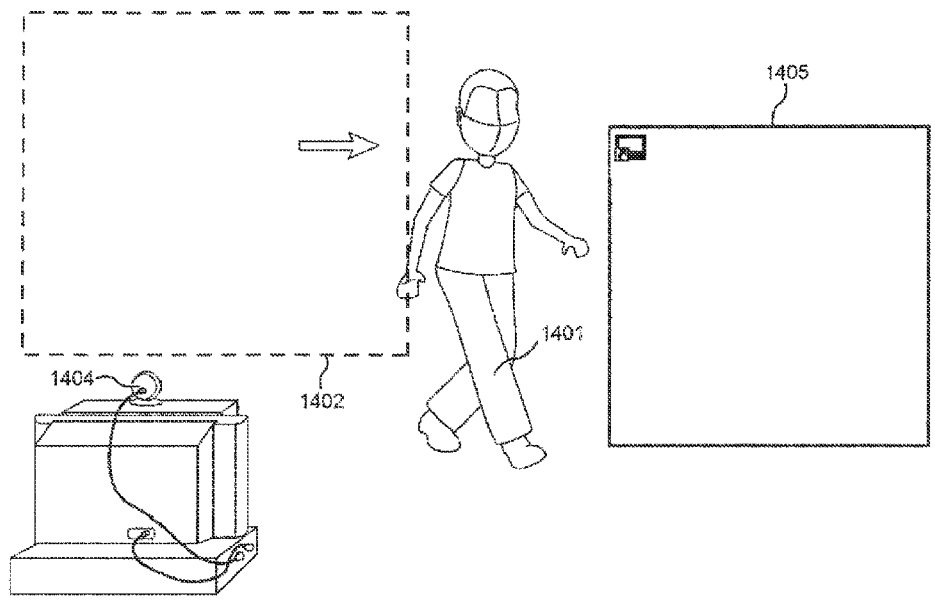

Another approach is to detect the physical presence of the torso of the user, and to disable the control when both the hand and the body move out of tracking range or are no longer between the camera and a plane define a certain distance away from the camera. As illustrated in FIG. 14, for instance, the user 1401 disables the control by moving outside of the frame-of-view 1402 of the camera 1404, causing the control to disappear from the user interface 1405.

Figure 15:
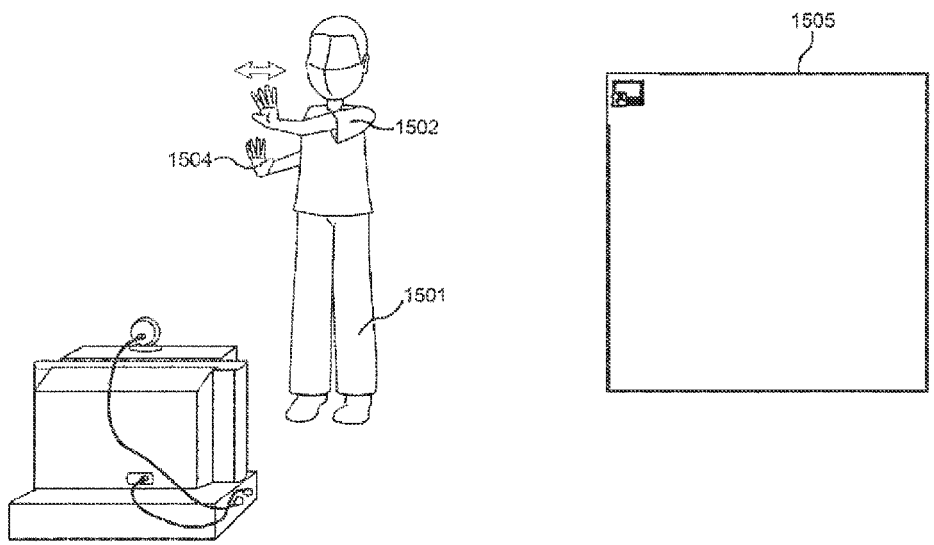

In the case where one interaction region is associated with a DISABLE CONTROL function, the user may also explicitly disable the control by sweeping their hand in the direction of that disabling interaction region. Furthermore, and as shown in FIG. 15, the user 1501 may disable the control via action of another control object, such as by gesticulating a second hand 1502 in a sweeping motion over the first hand 1504, thereby clearing the user interface 1505.

The control may be dynamically modified based on the identify or position of the user, based on other applications running on the device, on the amount of free space within the user interface, or for other reasons. For instance, and as shown in FIG. 16, if the user is identified as a child user 1601, the control 1602 may take on a simpler shape, and may have icons 1604 that are appropriate (such as age- or maturity appropriate) to the child user 1601. Similarly, if the user is identified as an adult user 1605, the control 1606 may take on a more complex shape, and may have fewer restrictions or otherwise allow additional access to icons or functionality that is appropriate to the adult user 1605.

Figure 17:
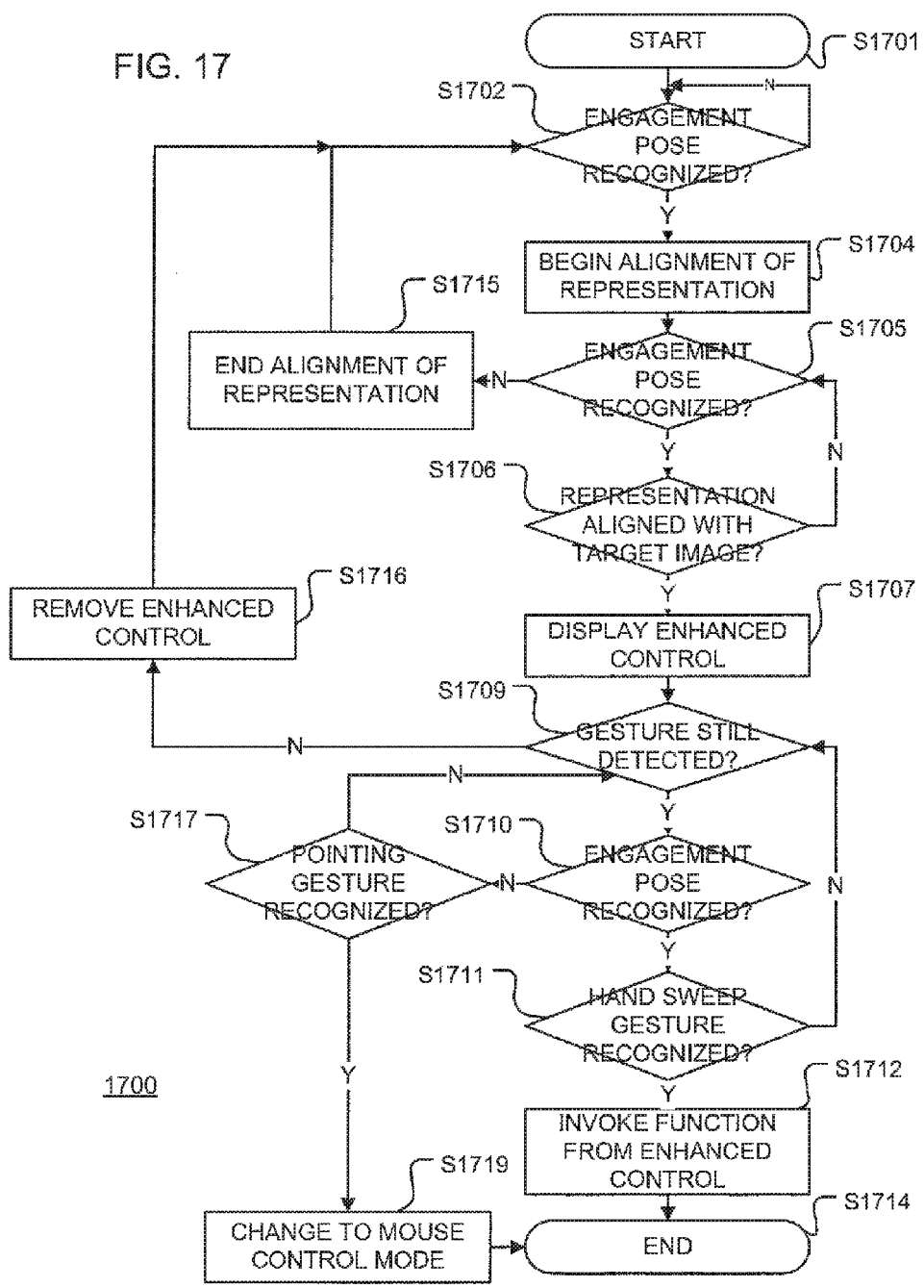

FIG. 17 is a flowchart of an exemplary process 1701 that effects enhanced input using recognized gestures. When the process 1701 begins (S1701), it is determined whether an engagement pose is detected from an image or images of a user (S1702). If it is determined that the engagement pose is not recognized (at S1702), the process 1700 waits until the engagement pose is recognized (S1702).

If an engagement pose is detected (at S 1702), the a representation alignment process begins (S1704), and it is again determined whether the engagement pose is still detected (S1705). If it is determined that the engagement pose is still detected (at S1705), it is determined whether the representation is aligned with the target image (S1706).

If it is determined that the representation is aligned with the target image (at S1706), the enhanced control is displayed (S1707), and it is determined Whether the gesture is still detected (S1709). If the gesture is still detected (at S1709), it is determined whether the engagement pose is still present (S1710). If the engagement pose is still present (at S1710), it is determined whether a hand sweep gesture is recognized (S1711). If a hand sweep gesture is recognized (at S1711), the function associated with the hand sweep is invoked via the enhanced control (S1712), thereby ending the process 1700 (S1714).

If it is determined that the engagement pose is not recognized (at S1705), the alignment process for the representation ends (S1715), and the process 1700 waits until the engagement pose is recognized (S1702). If the representation is not aligned with the target image (S1706), it is determined whether the engagement pose is recognized (S1705). If the gesture is not still detected (S1709), the enhanced control is removed (S1716), and the process 1700 waits until the engagement pose is again recognized (S1702).

If the engagement pose is not recognized (S1710), it is determined whether a pointing gesture is recognized (S1710) and, if so, mouse control mode is activated (S1719) and the process 1700 ends (S1715). If the pointing gesture is not recognized (S1717), it is determined whether a gesture is still detected (S1709). If a hand-sweep gesture is not recognized (at S1711), it is determined whether the gesture is still detected (S1709).

In this regard, a user is enabled to interact with an enhanced on-screen control to thereby invoke media center functionality, by performing certain gestures that, based on accessing images of the user, are capable of automatic recognition. Among other features, the control includes icons that initially surround a representation of the user, effecting easy selection of underlying icon functionality through straightforward, intuitive, and natural motions of the user's body.

Figure 18:
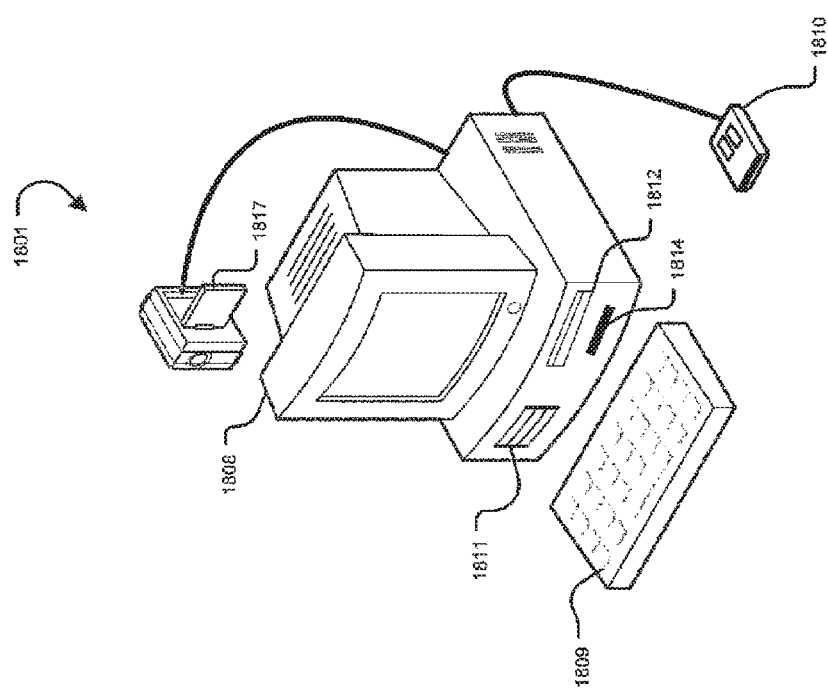
FIG. 18 illustrates an example of the exterior appearance of a computing device 1801 that further includes a processor and a user interface.

FIG. 18 illustrates an example of the exterior appearance of a computing device 1801 that further includes a processor and a user interface. In a further general implementation, a device includes a user interface and a processor. The user interface is configured to display a representation of a user in a central region of a control that further includes interaction elements disposed radially in relation to the central region. The processor is configured to recognize, from first and second images, a user's gesture, to interact with the control based on the recognized user's gesture, and to control an application based on interacting with the control.

In more detail, the hardware environment of the computing device 1801 includes a display monitor 1808 for displaying text and images to interface with a user, a keyboard 1809 for entering text data and user commands into the computing device 1801, a mouse 1810 for pointing, selecting and manipulating objects displayed on the display monitor 1808, a fixed disk drive 1811, a removable disk drive 1812, a tape drive 1814, a hardcopy output device, a computer network connection, and a digital input device 1817.

The display monitor 1808 displays the graphics, images, and text that make up the user interface for the software applications used by the computing device 1801, as well as the operating system programs necessary to operate the computing device 1801. A user uses the keyboard 1809 to enter commands and data to operate and control the computer operating system programs as well as the application programs. The mouse 1810 may be any type of pointing device, and may be a joystick, a trackball, a touch-pad, or other pointing device. Software used to display a user interface and enable a user to enter or select text, numbers, or select from a menu of options is stored locally on computer readable memory media, such as the fixed disk drive 1811.

In a further implementation, the fixed disk drive 1811 itself may include a number of physical drive units, such as a redundant array of independent disks ("RAID"), or may be a disk drive farm or a disk array that is physically located in a separate computing unit. Such computer readable memory media allow the computing device 1801 to access computer-executable process steps, application programs and the like, stored on removable and non-removable memory media.

The computer network connection may be a modem connection, a local-area network ("LAN") connection including the Ethernet, or a broadband wide-area network ("WAN") connection such as a digital subscriber line ("DSL"), cable high-speed internet connection, a broadband over power line connection, dial-up connection, T-1 line, T-3 line, fiber optic connection, or satellite connection. The network 1306 may be a LAN network, a corporate or government WAN network, the Internet, or other network.

The computer network connection may be a wireline or wireless connector. Example wireless connectors include, for example, an INFRARED DATA ASSOCIATION® ("irDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-1394 FIREWIRE® connector, a Universal Serial Bus ("USB") connector, a serial port connector, a parallel port connector, or other wireline connector.

The removable disk drive 1812 is a removable storage device that is used to off-load data from the computing device 1801 or upload data onto the computing device 1801. The removable disk drive 1812 may be a floppy disk drive, an IOMEGA® ZIP® drive, a compact disk-read only memory ("CD-ROM") drive, a CO-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HODS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1811 or on removable media for the removable disk drive 1812.

The tape drive 1814 is a tape storage device that is used to off-load data from the computing device 1801 or to upload data onto the computing device 1801. The tape drive 1814 may be a quarter-inch cartridge ("QIC"), 4 mm digital audio tape ("DAT"), 8 mm digital linear tape ("DLT") drive, or other type of tape.

Furthermore, although the computing device 1801 is described above as a desktop PC, in further implementations the computing device 1801 may be a laptop, a workstation, a midrange computer, a mainframe, an embedded system, telephone, a handheld or tablet computer, a PDA, a gaming device or console, a digital picture frame, a teleconferencing device, or other type of computer.

Figure 19:
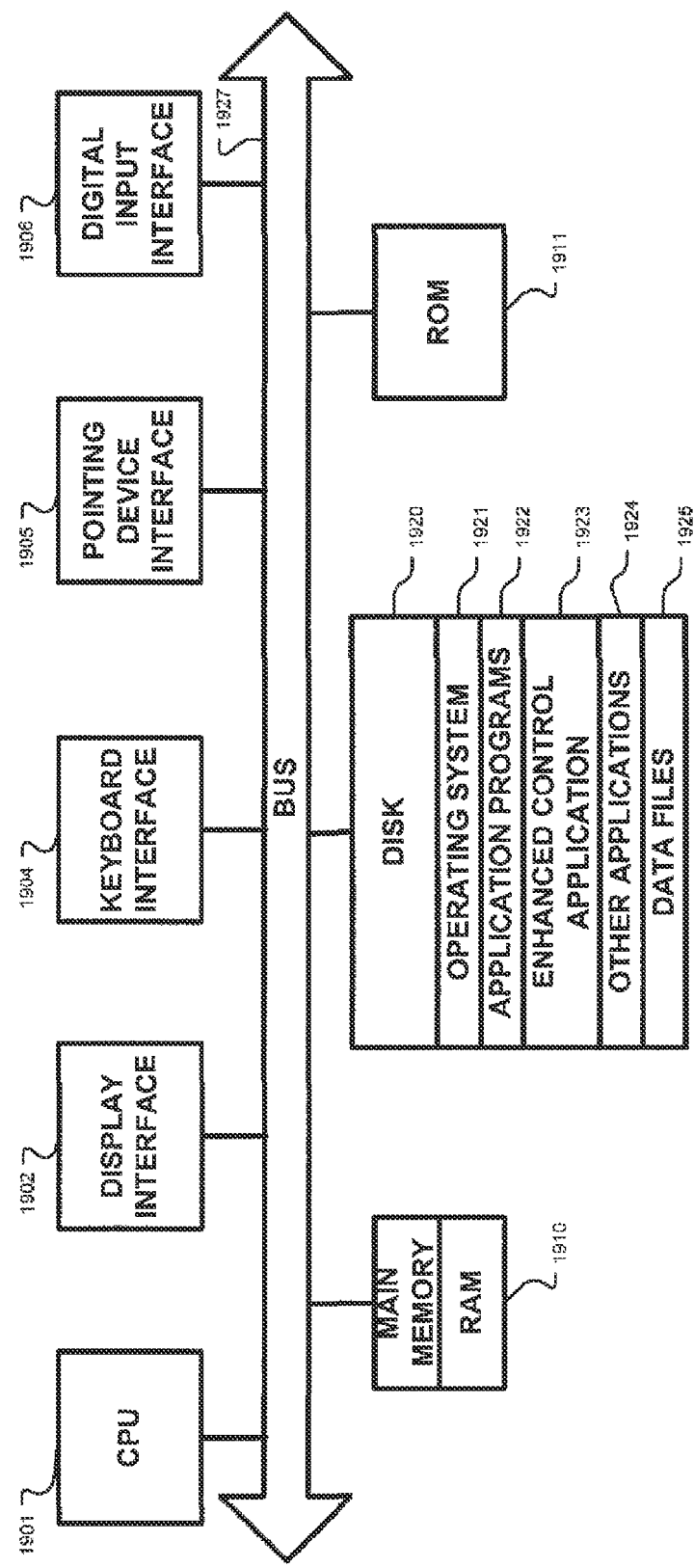
FIG. 19 is a block diagram illustrating the internal architecture of the computer shown in FIG. 18.

FIG. 19 is a block diagram illustrating the internal architecture of a computer shown in FIG. 18. An exemplary internal architecture of the computing device 1801 is now described. The computing environment includes a computer central processing unit ("CPU") 1901, where the computer instructions that make up an operating system or an application are processed; a display interface 1902 which provides a communication interface and processing functions for rendering graphics, images, and texts on the display monitor 1808; a keyboard interface 1904 which provides a communication interface to the keyboard 1809; a pointing device interface 1905 which provides a communication interface to the mouse 1810 or an equivalent pointing device; a digital input interface 1906 which provides a communication interface to the digital input device 1817; a hardcopy output device interface which provides a communication interface to the hardcopy output device; a random access memory ("RAM") 1910 where computer instructions and data are stored in a volatile memory device for processing by the computer CPU 1901; a read-only memory ("ROM") 1911 where invariant low-level systems code or data for basic system functions such as basic input and output ("I/O"), startup, or reception of keystrokes from the keyboard 1809 are stored in a non-volatile memory device; and a storage 1920 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that make up an operating system 1921, application programs 1922 (including the enhanced control application 1923, and other applications 1924 as necessary) and data files 1925 are stored; a computer network interface which provides a communication interface to the network over the computer network connection. The constituent devices and the computer CPU 1901 communicate with each other over the computer bus 1927.

According to one general implementation, a computer program product is tangibly embodied or recorded in a machine-readable medium such as storage 1920. The computer program product includes instructions that, when read by a machine, operate to cause data processing apparatus to recognize, from first and second images, a user's gesture, to display a representation of the user in a central region of a control that further includes interaction elements disposed radially in relation to the central region, to interact with the control based on the recognized user's gesture, and to control an application based on interacting with the control.

The RAM 1910 interfaces with the computer bus 1927 so as to provide quick RAM storage to the computer CPU 1901 during the execution of software programs such as the operating system application programs, and device drivers. More specifically, the computer CPU 1901 loads computer-executable process steps from the fixed disk drive 1811 or other memory media into a field of the RAM 1910 in order to execute software programs. Data is stored in the RAM 1910, where the data is accessed by the computer CPU 1901 during execution.

The computing device 1801 stores computer-executable code for an operating system 1921, application programs 1922 such as word processing, spreadsheet, presentation, gaming, or other applications. Although it is possible to output the enhanced control a user interface and enable a user to enter text, numbers, or select from the control using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 1901 is one of a number of high-performance computer processors, including an INTEL® or AMD® processor, a POWERPC® processor, a MIPS® reduced instruction set computer ("RISC") processor, a SPARC® processor, an ACORN® RISC Machine (ARM®) architecture processor, a HP ALPHASERVER® processor or a proprietary computer processor for a mainframe. In an additional arrangement, the computer CPU 1901 is more than one processing unit, including a multiple CPU configuration found in high-performance workstations and servers, or a multiple scalable processing unit found in mainframes.

The operating system 1921 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1921 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 18 and 19 illustrate one possible implementation of a computing device that executes program code, or program or process steps, configured to provide for an enhanced control that allows for a user to intuitively and easily enter text, numbers, or select from a plurality of items, other types of computers or implementations may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method of interacting with a user interface comprising:
    detecting a plurality of users in a first image obtained from a camera;
    selecting a first user of the plurality of users based on a priority of the first user among the plurality of the users, the priority being assigned based on an identity of one or more of the plurality of users;
    providing control of the user interface to the first user of the plurality of users based on the selection;
    recognizing, from at least a second image obtained from the camera, a gesture of the first user; and
    interacting with the user interface based on the recognized gesture.

2. The computer-implemented method of claim 1, wherein the recognized gesture comprises a gesture that transfers control to a second user of the plurality of users, the method further comprising providing control of the user interface to the second user of the plurality of users based on the transfer.

3. The computer-implemented method of claim 2, further comprising:
    recognizing, from at least a third image obtained from the camera, a second gesture of the first user; and
    providing control of the user interface to the first user of the plurality of users based on the recognized second gesture.

4. The computer-implemented method of claim 2, further comprising providing control of the user interface to the first user of the plurality of users after a threshold period of inactivity has elapsed.

5. The computer-implemented method of claim 1, further comprising causing the user interface to display one or more interaction elements.

6. The computer-implemented method of claim 5, further comprising:
    identifying the recognized gesture as an engagement gesture; and
    causing the user interface to display the one or more interaction elements, based, at least in part, on the identifying the recognized gesture as the engagement gesture.

7. The computer-implemented method of claim 5, wherein causing the user interface to display the one or more interaction elements comprises:
    selecting one or more interaction elements, based, at least in part, on an identity of the first user; and
    causing the user interface to display the selected one or more interaction elements.

8. The computer-implemented method of claim 5, wherein causing the user interface to display the one or more interaction elements comprises:
    selecting one or more interaction elements, based, at least in part, on a recognized demographic of at least one user of the plurality of users; and
    causing the user interface to display the selected one or more interaction elements with the user interface.

9. The computer-implemented method of claim 1, wherein the selecting the first user of the plurality of users based on the priority of the first user among the plurality of the users further comprises determining that the priority of the first user is higher than a priority of a second user of the plurality of users.

10. The computer-implemented method of claim 9, wherein the determination that the priority of the first user is higher than the priority of the second user of the plurality of users comprises:
    performing facial recognition to determine an identity of the first user and an identity of the second user; and
    determining based, at least in part, on the identity of the first user and the identity of the second user, that the first user has a higher priority than the second user.

11. A device comprising:
    a display configured to show a graphical user interface;
    a processor communicatively coupled with the display and configured to:
    detect a plurality of users in a first image obtained from a camera;
    select a first user of the plurality of users based on a priority of the first user among the plurality of the users, the priority being assigned based on an identity of one or more of the plurality of users;
    provide control of the graphical user interface to the first user of the plurality of users based on the selection;
    recognize, from at least a second image obtained from the camera, a gesture of the first user; and
    interact with the graphical user interface based on the recognized gesture.

12. The device of claim 11, wherein the processor is further configured to:
    recognize the gesture of the first user as a gesture that transfers control to a second user of the plurality of users; and
    provide control of the graphical user interface to the second user of the plurality of users based on the transfer.

13. The device of claim 12, wherein the processor is further configured to:
    recognize, from at least a third image obtained from the camera, a second gesture of the first user; and
    provide control of the graphical user interface to the first user of the plurality of users based on the recognized second gesture.

14. The device of claim 12, wherein the processor is further configured to provide control of the graphical user interface to the first user of the plurality of users after a threshold period of inactivity has elapsed.

15. The device of claim 11, wherein the processor is further configured to cause the graphical user interface to display one or more interaction elements.

16. The device of claim 15, wherein the processor is further configured to:
    identify the recognized gesture as an engagement gesture; and
    cause the graphical user interface to display the one or more interaction elements, based, at least in part, on the identifying the recognized gesture as the engagement gesture.

17. The device of claim 15, wherein the processor is further configured to cause the graphical user interface to display the one or more interaction elements, at least in part, by:
    selecting one or more interaction elements, based, at least in part, on an identity of the first user; and causing the graphical user interface to display the selected one or more interaction elements with the graphical user interface.

18. The device of claim 15, wherein the processor is further configured to cause the graphical user interface to display the one or more interaction elements, at least in part, by:
selecting one or more interaction elements, based, at least in part, on a recognized demographic of at least one user of the plurality of users; and
causing the graphical user interface to display the selected one or more interaction elements with the graphical user interface.

19. The device of claim 11, wherein the processor is configured to select the first user of the plurality of users based on the priority of the first user among the plurality of the users by determining that the priority of the first user is higher than a priority of a second user of the plurality of users.

20. The device of claim 19, wherein the processor is configured to determine that the priority of the first user is higher than the priority of the second user of the plurality of users, at least in part, by:
performing facial recognition to determine an identity of the first user and an identity of the second user; and
determining based, at least in part, on the identity of the first user and the identity of the second user, that the first user has a higher priority than the second user.

21. A non-transitory computer-readable medium having instructions embedded thereon for interacting with a user interface, the instructions including computer code for:
detecting a plurality of users in a first image obtained from a camera;
selecting a first user of the plurality of users based on a priority of the first user among the plurality of the users, the priority being assigned based on an identity of one or more of the plurality of users;
providing control of the user interface to the first user of the plurality of users based on the selection;
recognizing, from at least a second image obtained from the camera, a gesture of the first user; and
interacting with the user interface based on the recognized gesture.

22. The non-transitory computer-readable medium of claim 21, further comprising computer code for recognizing the gesture of the first user as a gesture that transfers control to a second user of the plurality of users, and providing control of the user interface to the second user of the plurality of users based on the transfer.

23. The non-transitory computer-readable medium of claim 22, further comprising computer code for:
recognizing, from at least a third image obtained from the camera, a second gesture of the first user; and
providing control of the user interface to the first user of the plurality of users based on the recognized second gesture.

24. The non-transitory computer-readable medium of claim 22, further comprising computer code for providing control of the user interface to the first user of the plurality of users after a threshold period of inactivity has elapsed.

25. The non-transitory computer-readable medium of claim 21, further comprising computer code for causing the user interface to display one or more interaction elements.

26. The non-transitory computer-readable medium of claim 25, further comprising computer code for:
identifying the recognized gesture as an engagement gesture; and
causing the user interface to display the one or more interaction elements, based, at least in part, on the identifying the recognized gesture as the engagement gesture.

27. The non-transitory computer-readable medium of claim 25, wherein the computer code for causing the user interface to display the one or more interaction elements further comprises computer code for:
selecting one or more interaction elements, based, at least in part, on an identity of the first user; and
displaying the selected one or more interaction elements with the user interface.

28. The non-transitory computer-readable medium of claim 25, wherein the computer code for causing the user interface to display the one or more interaction elements further comprises computer code for:
selecting one or more interaction elements, based, at least in part, on a recognized demographic of at least one user of the plurality of users; and
displaying the selected one or more interaction elements with the user interface.

29. The non-transitory computer-readable medium of claim 21, wherein computer code for selecting the first user of the plurality of users based on the priority of the first user among the plurality of the users further comprises computer code for determining that the priority of the first user is higher than a priority of a second user of the plurality of users.

30. The non-transitory computer-readable medium of claim 29, wherein the computer code for determining that the priority of the first user is higher than the priority of the second user of the plurality of users comprises computer code for:
performing facial recognition to determine an identity of the first user and an identity of the second user; and
determining based, at least in part, on the identity of the first user and the identity of the second user, that the first user has a higher priority than the second user.

31. An apparatus comprising:
means for detecting a plurality of users in a first image obtained from image capture means;
means for selecting a first user of the plurality of users based on a priority of the first user among the plurality of the users, the priority being assigned based on an identity of one or more of the plurality of users;
means for providing control of the user interface to the first user of the plurality of users based on the selection;
means for recognizing, from at least a second image obtained from the image capture means, a gesture of the first user; and
means for interacting with the user interface based on the recognized gesture.

32. The apparatus of claim 31, wherein the recognized gesture comprises a gesture that transfers control to a second user of the plurality of users, the apparatus further comprising means for providing control of the user interface to the second user of the plurality of users based on the transfer.

33. The apparatus of claim 32, further comprising:
means for recognizing, from at least a third image obtained from the image capture means, a second gesture of the first user; and
means for providing control of the user interface to the first user of the plurality of users based on the recognized second gesture.

34. The apparatus of claim 32, further comprising means for providing control of the user interface to the first user of the plurality of users after a threshold period of inactivity has elapsed.

35. The apparatus of claim 31, further comprising means for causing the user interface to display one or more interaction elements.

36. The apparatus of claim 35, further comprising:
means for identifying the recognized gesture as an engagement gesture; and
means for causing the user interface to display the one or more interaction elements, based, at least in part, on the identifying the recognized gesture as the engagement gesture.

37. The apparatus of claim 35, wherein the means for causing the user interface to display the one or more interaction elements comprises:
means for selecting one or more interaction elements, based, at least in part, on an identity of the first user; and
means for causing the user interface to display the selected one or more interaction elements.

38. The apparatus of claim 35, wherein the means for causing the user interface to display the one or more interaction elements comprises:
means for selecting one or more interaction elements, based, at least in part, on a recognized demographic of at least one user of the plurality of users; and
means for causing the user interface to display the selected one or more interaction elements with the user interface.

39. The apparatus of claim 31, wherein the means for selecting the first user of the plurality of users based on the priority of the first user among the plurality of the users further comprises means for determining that the priority of the first user is higher than a priority of a second user of the plurality of users.

40. The apparatus of claim 39, wherein the means for determining that the priority of the first user is higher than the priority of the second user of the plurality of users comprises:
means for performing facial recognition to determine an identity of the first user and an identity of the second user; and
means for determining based, at least in part, on the identity of the first user and the identity of the second user, that the first user has a higher priority than the second user.

* * * * *